United States Patent Office 3,637,899
Patented Jan. 25, 1972

3,637,899
ELASTOMERIC BLOCK COPOLYMERS AND
METHODS OF PRODUCING THE SAME
Nikolai Sergeevich Nametkin, Ulitsa Vavilova 37a, kv. 10;
Sergei Garievich Durgarian, Ulitsa Garibaldi 21, korpus
3, kv. 67; Evgeny Vladimirovich Soloviev, B. Cherki-
zovskaya ulitsa 12, korpus 4, kv. 41; and Viktor Maxo-
vich Piryatinsky, 5 Tverskaya-Yamskaya ulitsa 6, kv.
101, all of Moscow, U.S.S.R.
No Drawing. Filed Apr. 8, 1969, Ser. No. 814,464
Claims priority, application U.S.S.R., Apr. 9, 1968,
1,232,460
Int. Cl. C08f 29/12, 35/02
U.S. Cl. 260—827                               28 Claims

ABSTRACT OF THE DISCLOSURE

A method of producing elastomeric block copolymers of the type A–B–A, wherein block A is a polymer of vinyltriorganosilanes having a molecular weight of 5,000 to 200,000 and block B is a polymer of a conjugated diene having a molecular weight of 15,000–500,000, by anionic block copolymerization of vinyltriorganosilanes or a mixture of the same with styrene or a derivative of styrene, and conjugated dienes in an organic solvent in the presence of a lithium-based catalyst.

---

This invention relates to new types of elastomeric block copolymers which can be utilized over a wide range of operating temperatures and method of producing the same.

A series of elastomeric block copolymers of the structural type A–B–A is known, where block A is a non-elastic polymer of a monoalkenyl aromatic hydrocarbon and block B an elastomeric polymer of a conjugated diene hydrocarbon (cf. Brit. Pat. 1,000,090; 1,014,999; 1,025,-295; Fr. Pat. 1,459,399).

One of the disadvantages of these prior art block copolymers of the A–B–A type is the low glass-transition temperature of block A, as a consequence of which their use at high temperatures (e.g. at temperatures higher than 80° C.) is impossible.

It is an object of the present invention to provide new polymeric materials of the A—B—A type which can be used over a wide range of operating temperatures from −80° to +50° C. or higher.

The foregoing and other objects have been accomplished by the provision of elastomeric block copolymers of the A–B–A type where block B is a polymer of a conjugated diene, while block A, according to the invention, is a polymer of vinyltriorganosilanes or a copolymer of vinyltriorganosilanes and styrene or derivatives of styrene. Such a block A has an average molecular weight of 5,000 to 200,000 and a glass-transition temperature of 100 to 180° C. In the A–B–A block copolymer, polymeric block A constitutes 10–50% by weight of the weight of the block copolymer.

For producing block A, vinyltriorganosilanes of the following structure are used:

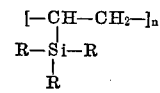

where R represents identical or different radicals, viz: alkyl radicals of normal or branched structure with one to four carbon atoms, aryl or substituted aryl or naphthenic radicals. For producing block A there can be used such monomers as vinylethyldimethylsilane, vinylbutyldimethylsilane, vinyltrimethylsilane and vinylphenyldimethylsilane, as well as copolymers of said monomers and styrene or its derivatives.

Said block copolymers of type A–B–A are produced, according to the invention, by anionic block copolymerization of conjugated dienes and vinyltriorganosilanes or a mixture of the same with styrene or derivatives of styrene in the presence of lithium-based catalysts in an organic solvent.

Under the above conditions there are produced non-elastomeric high-molecular compounds of the following structure:

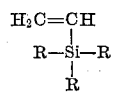

The process of producing silicon-containing block copolymers of the type A–B–A can be carried out in the presence of the following anionic polymerization catalysts: metallic lithium, lithium alkyls or other lithium-organic compounds. The alkyls in said lithium alkyls are preferably branched, e.g. isopropyllithium, sec. butyllithium, isobutyllithium, isoamyllithium, etc., owing to their high velocity of reaction with vinyltriorganosilanes.

Block copolymerization is carried out in hydrocarbon solvents: lower alkanes of normal and iso-structure containing from 5 to 10 carbon atoms, aromatic and cycloaromatic hydrocarbons or mixtures of the same, e.g. hexane, cyclohexane, benzene, toluene, or mixtures of the same, etc.

In the presence of metallic lithium or lithium-organic compounds in the above-mentioned hydrocarbon solvents there is obtained a high content of elastomeric block B of 1,4-cis structure which has a molecular weight within the range from 15,000 to 500,000. Polymerization is carried out at temperatures from 0° to 70° C.

The concentration of the catalyst can vary within a wide range, depending on the required molecular weight of the block copolymer, e.g., from 0.001 mol/l. to 0.1 mol/l.

In order to obtain the best elastic properties in the block copolymer, the non-elastic terminal blocks A should have a molecular weight within the range from 10,000 to 80,-000, with a glass-transition temperature within the range from 100 to 180° C. Elastomeric block B should have an average molecular weight within the range from 15,000 to 500,000 with a glass-transition temperature from −50 to −90° C.

Polymerization can be carried out in vacuum (from $10^{-1}$ to $10^{-5}$ mm. of mercury) or in an atmosphere of a dry and purified inert gas, e.g. nitrogen, argon, etc.

The block copolymer of the general formula A–B–A can be produced in two ways: by the consecutive addition of monomers, or by employing coupling substances.

The consecutive process of adding monomers is carried out as follows.

In the first stage there is produced in the presence of lithium alkyls and an organic solvent a non-elastomeric polyvinyltriorganosilane block A, e.g. polyvinyltrimethylsilane polymer having a terminal lithium ion, a so-called living polymer. This stage is completed when the free catalyst and monomer are completely exhausted. In the second stage there is added a conjugated diene, e.g. butadiene or isoprene which grows on the polymeric chains of block A, forming elastomeric block B. Block B also has a lithium ion at the ends of the polymeric chains, and after completion of diene polymerization a block copolymer of the structure A–B–Li is obtained. In the third stage there is again added vinyltriorganosilane, which grows on the polymeric chains A–B–Li to form the terminal non-elastomeric block A.

In a variation of this process metallic lithium is employed. In this case there is first obtained in an organic solvent an intermediate elastomeric conjugated diene block B with lithium ions at the ends of the chains:Li–B–Li. This stage is completed when the conjugated diene has been completely exhausted. Vinyltriorganosilanes or a mixture of vinyltriorganosilanes and styrene or derivatives of styrene are then added and polymerization continued until the monomer has been completely exhausted, block A growing simultaneously on both ends of block B to give the final product A–B–A. Thus, the process is carried out in two stages.

In block copolymerization employing coupling substances, there is obtained in the first stage of the process, as in the consecutive process, non-elastomeric block A, e.g., polyvinyldimethylphenylsilane having lithium ions at the ends of the polymeric chains.

In the second stage there is added to the living chains of block A the required amount of conjugated diolefine, e.g., isoprene, and after completion of the polymerization of said diolefine there is formed a living block copolymer of the general formula A–1/2B–Li.

The next stage in this process is joining these intermediate block copolymers to give a substance of twice the molecular weight having the formula A–1/2B–C–1/2B–A, where C is the coupling agent.

This reaction proceeds satisfactorily when dihaloid derivatives of hydrocarbons having 1 to 10 carbon atoms are employed as coupling agents, e.g. 1,2-dibromoethane; 1,4-dibromobutane; 1,10-dibromodecane; etc.

We have found, and it is a part of the teaching of the present invention, that as highly effective coupling agents there may be employed organosilicon bifunctional compounds of the following structure:

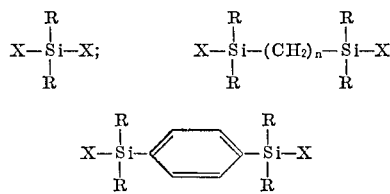

where X is Br, Cl, OR, OH, H; $n=1-6$;

R is like or unlike alkyl radicals of normal or branched structure having 1 to 16 carbon atoms, or aryl or substituted aryl or naphthenic radicals.

The higher effectiveness of said coupling agents is due to the fact that the bonds $\equiv$Si—X, $\equiv$Si—H, $\equiv$Si—OR and $\equiv$Si—OH are more reactive in respect to lithium ions than the bonds $\equiv$C—X, $\equiv$C—H, $\equiv$C—OR and $\equiv$C—OH. This leads to more rapid and complete coupling of the intermediate block copolymers. It should be noted that if dihydride-dialkyl - (aryl) - silanes are employed the final polymeric product will be free from traces of haloid.

The amount of coupling agent used depends on the physicotechnical properties of the required product. The necessary amount of coupling agent can be added at once or gradually.

The maximum effectiveness of the bifunctional compound is achieved if it is added in amounts from 0.5 to 5 or more equivalents to each equivalent of lithium ion, the optimum amount and the temperature and duration of the reaction being determined experimentally.

An advantage of the present invention is that depending on the nature of the substituent at the silicon atom it is possible to produce silicon-hydrocarbon polymers (polysilcarbanes) with a wide range of glass-transition temperatures from 50 to 180° C. The use of static copolymers of vinyl derivatives of silicon and styrene or its derivatives for producing block A makes it possible to utilize such a cheap and readily available monomer as styrene, while being able to finely adjust the glass-transition temperature of block A over the temperature range from 100 to 180° C. by adding a definite amount of styrene.

Below are given the glass-transition temperatures of some polymers based on vinyltriorganosilanes which are employed for producing block A.

| Polymer: | Glass-transition temperature ° C. |
|---|---|
| Polyvinyltrimethylsilane | 170–180 |
| Polyvinylphenyldimethylsilane | 145–155 |
| Polyvinylethyldimethylsilane | 130–140 |
| Copolymer of vinylphenyldimethylsilane and styrene (molar ratio 1:1) | 112–117 |
| Copolymer of vinylphenyldimethylsilane and styrene (molar ratio 1:3) | 95–98 |

The process of the present invention can better be understood by reference to the following examples of several embodiments thereof, but it is intended that they shall be interpreted as illustrative only and by no means as limiting the scope of the invention.

EXAMPLE 1

To 0.04 mol of vinyltrimethylsilane are added 33 ml. of cyclohexane and the mixture is heated to 35° C. after which 0.0003 mol of secondary butyllithium is added. Polymerization is carried out in a reaction flask at a temperature of 35° C. until the vinyltrimethylsilane has been completely exhausted.

The polyvinyltrimethylsilane has an intrinsic viscosity $[\eta]=0.19$ dl./g. (at 20° C. in cyclohexane).

To the reaction mixture are added 0.10 mol of isoprene and 100 ml. of cyclohexane, and polymerization carried out at 35° C. until the isoprene has been completely exhausted.

The intermediate block copolymer produced has an in trinsic viscosity $[\eta]=0.71$ dl./g. (at 20° C. in cyclohexane); the vinyltrimethylsilane content in the block-copolymer is 37.1% by weight.

To the intermediate block copolymer with living chains are now added 0.04 mol of vinyltrimethylsilane and 150 ml. of cyclohexane and polymerization continued at 35° C. until the vinyltrimethylsilane has been completely exhausted.

The final block copolymer produced is dissolved in cyclohexane, reprecipitated in isopropyl alcohol, filtered and dried to constant weight.

The block copolymer obtained has an intrinsic viscosity $[\eta]=0.79$ dl./g. (at 20° C. in cyclohexane) and a vinyltrimethylsilane content of 49.1% by weight.

EXAMPLE 2

To 0.015 mol of vinylphenyldimethylsilane and 0.024 mol of styrene are added 33 ml. of heptane and the mixture is heated to 40° C. after which 0.0004 mol of n-butyllithium is added. Copolymerization is carried out at 40° C. until the monomers have been completely exhausted.

The copolymer obtained has an intrinsic viscosity $[\eta]=0.29$ dl./g. (at 20° C. in cyclohexane) and contains 47% by weight of vinylphenyldimethylsilane.

To the reaction mixture are then added 0.22 mol of isoprene and 200 ml. of heptane, and polymerization carried out at 35° C. until the isoprene has been completely exhausted.

The intermediate block copolymer has an intrinsic viscosity $[\eta=0.81$ dl./g. at 20° C. in cyclohexane) and contains 14.1% by weight of vinylphenyldimethylsilane.

To the living chains of the intermediate block copolymer thus obtained are added 0.015 mol of vinylphenyldimethylsilane and 0.024 mol of styrene in 250 ml. of heptane. Polymerization is continued at 40° C. until the monomers have been completely exhausted.

The block copolymer produced is dissolved in heptane and reprecipitated in ethyl alcohol, filtered and dried to constant weight.

The block copolymer has an intrinsic viscosity $[\eta]=0.89$ dl./g. (at 20° C. in cyclohexane) and a vinylphenyldimethylsilane content of 20.9% by weight.

EXAMPLE 3

The process is carried out as in Example 2 but block A is formed with a mixture of monomers: 0.015 mol of vinyltrimethylsilane and 0.048 mol of styrene.

The final block copolymer has an intrinsic viscosity $[\eta]=0.80$ dl./g. (at 20° C. in cyclohexane) and a vinyltrimethylsilane content of 11.5% by weight.

EXAMPLE 4

To 0.04 mol of vinyltrimethylsilane are added 50 ml. of cyclohexane and the mixture is heated to 30° C., after which 0.0004 mol of sec. amyllithium is added. Polymerization is carried out at 30° C. until the vinyltrimethylsilane is completely exhausted. The polymer obtained has an intrinsic viscosity $[\eta]=0.22$ dl./g. (at 20° C. in cyclohexane).

To the reaction mixture are then added 0.092 mol of butadiene and 100 ml. of cyclohexane, and polymerization continued at 25° C. until the butadiene is completely exhausted.

The intermediate block copolymer obtained has an intrinsic viscosity $[\eta]=0.48$ dl./g. and a vinyltrimethylsilane content of 50% by weight.

To the living chains of the intermediate block copolymer is added 0.0004 mol of methylphenylsilane

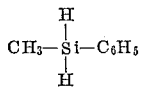

as coupling agent, along with 100 ml. of cyclohexane. The addition reaction is carried out at 50° C. over a period of 5 hours.

The final block copolymer produced is dissolved in cyclohexane, reprecipitated in isopropyl alcohol, filtered and dried to constant weight. The final block copolymer has an intrinsic viscosity $[\eta]=0.76$ dl./g. and a vinyltrimethylsilone content of 50% by weight.

EXAMPLE 5

To 0.062 mol of vinylphenyldimethylsilane are added 50 ml. of benzene and the mixture heated to 50° C. after which 0.003 mol of ethyllithium is added. Polymerization is carried out at 50° C. until the monomer is completely exhausted. The polymer obtained has an intrinsic viscosity $[\eta]=0.30$ dl./g.

To the reaction mixture are added 0.456 mol of isoprene and 400 ml. of benzene, and polymerization continued at 35° C. until the isoprene is completely exhausted. The intermediate block copolymer has a viscosity $[\eta]=0.79$ dl./g. and a vinylphenyldimethylsilane content of 28.1% by weight.

To the living chains of the block copolymer is added 0.062 mol of vinylphenyldimethylsilane and 250 ml. of benzene and polymerization continued at 50° C. until the monomer is completely exhausted.

The block copolymer obtained is dissolved in benzene, reprecipitated in ethyl alcohol, filtered and dried to constant weight.

The final block copolymer has an intrinsic viscosity $[\eta]=0.91$ dl./g. (at 20° C. in cyclohexane) and a vinylphenyldimethylsilane content of 40.5% by weight.

EXAMPLE 6

To 0.0085 mol of vinylbutyldimethylsilane are added 20 ml. of benzene and the mixture heated to 45° C., after which 0.0004 mol of sec. butyllithium is added. Polymerization is carried out at 45° C. until the monomer is completely exhausted.

The polymer obtained has a viscosity $[\eta]=0.12$ dl./g. (at 20° C. in cyclohexane).

To the reaction mixture are then added 0.32 mol of isoprene and 200 ml. of benzene and polymerization carried out at 35° C. until the isoprene is completely exhausted.

The intermediate block copolymer has an intrinsic viscosity $[\eta]=0.71$ dl./g. (at 20° C. in cyclohexane) and a vinylbutyldimethylsilane content of 5.2% by weight.

To the living chains of the intermediate block copolymer is added 0.0085 mol of vinylbutyldimethylsilane in 40 ml. of benzene and polymerization carried out at 45° C. until the monomer is completely exhausted.

The block copolymer produced is dissolved in benzene, reprecipitated in ethyl alcohol, filtered and dried to constant weight.

The final block copolymer has an intrinsic viscosity $[\eta]=0.73$ dl./g. (at 20° C. in cyclohexane) and a vinylbutyldimethylsilane content of 10% by weight.

EXAMPLE 7

0.22 mol of isoprene is dissolved in a mixture of 100 ml. of benzene and 100 ml. of toluene and heated to 35° C., after which 0.00057 g-atom of metallic lithium is added to the mixture. Polymerization is carried out at 35° C. until the isoprene is completely exhausted.

The polyisoprene obtained has an intrinsic viscosity $[\eta]=0.71$ dl./g. (at 20° C. in cyclohexane).

To the living polyisoprene chains, Li–B–Li, is added 0.04 mol of vinylethyldimethylsilane in a mixture of 50 ml. of benzene and 50 ml. of toluene and polymerization continued at 50° C. until the vinylethyldimethylsilane is completely exhausted.

The block copolymer obtained is dissolved in benzene, reprecipitated in methyl alcohol, filtered and dried to constant weight.

The final block copolymer has an intrinsic viscosity $[\eta]=0.89$ dl./g. at 20° C. in cyclohexane) and a vinylethyldimethylsilane content of 14.9% by weight.

EXAMPLE 8

The process is carried out as in Example 4, but the coupling agent employed is a bifunctional organosilicon-containing compound of the following structure:

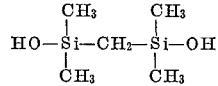

taken in fivefold excess in respect to lithium-ion, i.e., 0.002 mol.

The final block copolymer has an intrinsic viscosity $[\eta]=0.78$ dl./g. (at 20° C. in cyclohexane) and a vinyltrimethylsilane content of 48% by weight.

EXAMPLE 9

The process is carried out as in Example 4, but the monomer employed for producing block A is vinylbutyldimethylsilane (0.04 mol) and the coupling agent is the following bifunctional silicon-containing compound:

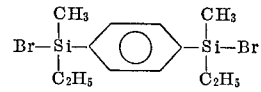

taken in twofold excess in respect to lithium-ion, i.e., 0.0008 mol.

The final block copolymer has an intrinsic viscosity $[\eta]=0.85$ dl./g. (at 20° C. in cyclohexane) and a vinylbutyldimethylsilane content of 49.5% by weight.

EXAMPLE 10

To 0.015 mol of vinylphenyldimethylsilane and 0.015 mol of 2,4-dimethylstyrene are added 33 ml. of cyclohexane and the mixture is heated to 40° C. after which 0.0004 mol of n-butyllithium is added. Copolymerization is carried out at 40° C. until the monomers are completely exhausted.

The copolymer obtained has an intrinsic viscosity $[\eta]=0.42$ dl./g. and contains 54% by weight of vinylphenyldimethylsilane.

To the reaction mixture are then added 0.22 mol of isoprene and 200 ml. of cyclohexane and polymerization carried out at 35° C. until the isoprene is completely exhausted. The intermediate block copolymer has an intrinsic viscosity [η]=0.86 dl./g. and a vinylphenyldimethylsilane content of 12.7% by weight.

To the living chains of the intermediate block copolymer obtained are added 0.015 mol of vinylphenyldimethylsilane and 0.015 mol of 2,4-dimethylstyrene, along with 250 ml. of cyclohexane. Polymerization is carried out at 40° C. until the complete exhaustion of the monomers.

The block copolymer obtained is dissolved in cyclohexane and reprecipitated in ethyl alcohol, filtered and dried to constant weight. The final block copolymer has an intrinsic viscosity [η]=0.91 dl./g. and a vinylphenyldimethylsilane content of 19.2% by weight.

We claim:

1. Elastomeric block copolymers of the general formula A–B–A in which block A is a polymer of a vinyltriorganosilane of the general formula

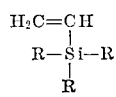

wherein R is selected from the group consisting of alkyl with 1 to 4 carbon atoms and phenyl, with an average molecular weight from 5,000 to 200,000 and a glass-transition temperature from 100° C. to 180° C., and block B is a polymer of a conjugated diene selected from the group consisting of butadiene and isoprene, with an average molecular weight from 15,000 to 500,000 and a glass-transition temperature lower than −20° C.

2. Elastomeric block copolymers as claimed in claim 1 wherein R represents identical radicals.

3. Elastomeric block copolymers as claimed in claim 1, wherein R represents different radicals.

4. Elastomeric block copolymers as claimed in claim 1, wherein block A is a polymer of a vinyltrimethylsilane with an average molecular weight from 5,000 to 200,000.

5. Elastomeric block copolymers as claimed in claim 1 wherein block A is a polymer of vinylphenyldimethylsilane with an average molecular weight from 5,000 to 200,000.

6. Elastomeric block copolymers as claimed in claim 1, wherein block A is a polymer of vinylethyldimethylsilane with an average molecular weight from 5,000 to 200,000.

7. Elastomeric block copolymers as claimed in claim 1, wherein block A is a polymer of vinylbutyldimethylsilane with an average molecular weight from 5,000 to 200,000.

8. Elastomeric block copolymers as claimed in claim 1, wherein block A constitutes 10–50% by weight of the block copolymer.

9. Elastomeric block copolymers as claimed in claim 1, wherein block B is 1,4-cis-polybutadiene with a 1,4-cis content higher than 80%.

10. Elastomeric block copolymers as claimed in claim 1, wherein block B is 1,4-cis-polyisoprene with a 1,4-cis content higher than 80%.

11. Elastomeric block copolymers of the general formula A–B–A wherein block A is a copolymer of styrene and a vinyltriorganosilane of the general formula

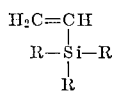

wherein R is selected from the group consisting of alkyl with 1 to 4 carbon atoms and phenyl, with an average molecular weight from 5,000 to 200,000 and a glass-transition temperature from 100° C. to 160° C. and block B is a polymer of a conjugated diene selected from the group consisting of butadiene and isoprene, with an average molecular weight from 15,000 to 500,000 and a glass-transition temperature lower than −20° C.

12. Elastomeric block copolymers as claimed in claim 11, wherein R represents identical radicals.

13. Elastomeric block copolymers as claimed in claim 11, wherein R represents different radicals.

14. Elastomeric block copolymers as claimed in claim 11 in which block A is a copolymer of vinyltrimethylsilane and styrene with an average molecular weight from 5,000 to 200,000.

15. Elastomeric block copolymers as claimed in claim 11 in which block A is a copolymer of vinylphenyldimethylsilane and styrene with an average molecular weight from 5,000 to 200,000.

16. Elastomeric block copolymers as claimed in claim 11 in which block A is a copolymer of vinylethyldimethylsilane and styrene with an average molecular weight from 5,000 to 200,000.

17. Elastomeric block copolymers as claimed in claim 11 in which block A is a copolymer of vinylbutyldimethylsilane and styrene with an average molecular weight from 5,000 to 200,000.

18. Elastomeric block copolymers as claimed in claim 11, wherein block A constitutes 10–50% by weight of the block copolymer.

19. Elastomeric block copolymers as claimed in claim 11, wherein block B is 1,4-cis-polybutadiene with a 1,4-cis content higher than 80%.

20. Elastomeric block copolymers as claimed in claim 11, wherein block B is 1,4-cis-polyisoprene with a 1,4-cis content higher than 80%.

21. Elastomeric block copolymers as claimed in claim 11, wherein the styrene content constitutes 10–90% by weight of block A.

22. A method of producing elastomeric block copolymers of the type A–B–A which comprises the polymerization of a monomer selected from the group consisting of vinyltriorganosilanes of the general formula

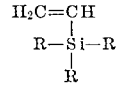

wherein R is selected from the group consisting of alkyl with 1 to 4 carbon atoms and phenyl, and a mixture of the aforesaid vinyltriorganosilanes and styrene, in an organic solvent in the presence of a lithium-based catalyst to form polymeric block A having a molecular weight from 5,000 to 200,000, the addition of a conjugated diene selected from the group consisting of butadiene and isoprene, and continuation of polymerization to form block B having a molecular weight of 15,000 to 500,000, followed by the addition of the aforesaid monomers to form block A having a molecular weight from 5,000 to 200,000.

23. A method of producing elastomeric block copolymers of the type A–B–A which comprises polymerization of a monomer selected from the group consisting of vinyltriorganosilanes of the general formula

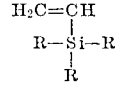

wherein R is selected from the group consisting of alkyl with 1 to 4 carbon atoms and phenyl, and a mixture of the aforesaid vinyltriorganosilanes and styrene, in an organic solvent in the presence of a lithium-based catalyst to form polymeric block A having molecular weight from 5,000 to 200,000, addition of a conjugated diene selected from the group consisting of butadiene and isoprene, and continuation of polymerization to form block B having a molecular weight from 7,500 to 250,000 followed by the addition of a bifunctional coupling siliconorganic compound of the general formula

wherein X is selected from the group consisting of Br, Cl, OR, OH and H, and R is selected from the group consisting of alkyl with 1 to 16 carbon atoms and aryl, and the formation of the final block copolymer.

24. A method according to claim 23, wherein said bifunctional coupling silicon-organic compound is

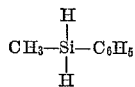

25. A method of producing elastomeric block copolymers of the type A–B–A which comprises polymerization of a monomer selected from the group consisting of vinyltriorganosilanes of the general formula

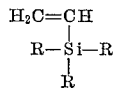

wherein R is selected from the group consisting of alkyl with 1 to 4 carbon atoms and phenyl, and a mixture of the aforesaid vinyltriorganosilanes and styrene, in an organic solvent in the presence of a lithium-based catalyst to form polymeric block A having molecular weight from 5,000 to 200,000, addition of a conjugated diene selected from the group consisting of butadiene and isoprene, and continuation of polymerization to form block B having a molecular weight from 7,500 to 250,000, followed by the addition of a bifunctional coupling silicon-organic compound of the general formula

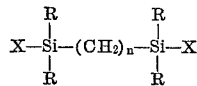

wherein $n=1-6$, X is selected from the group consisting of Br, Cl, OR, OH and H, and R is selected from the group consisting of alkyl with 1 to 16 carbon atoms and aryl, and the formation of the final block copolymer.

26. A method according to claim 25 wherein said bifunctional coupling silicon organic compound is

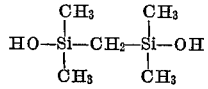

27. A method of producing elastomeric block copolymers of the type A–B–A which comprises polymerization of a monomer selected from the group consisting of vinyltriorganosilanes of the general formula

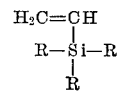

wherein R is selected from the group consisting of alkyl with 1 to 4 carbon atoms and phenyl, and a mixture of the aforesaid vinyltriorganosilanes and styrene, in an organic solvent in the presence of a lithium-based catalyst to form polymeric block A having molecular weight from 5,000 to 200,000, addition of a conjugated diene selected from the group consisting of butadiene and isoprene and continuation of polymerization to form block B having a molecular weight from 7,500 to 250,000, followed by the addition of a bifunctional coupling siliconorganic compound of the general formula

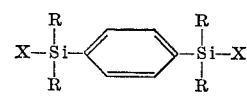

wherein X is selected from the group consisting of Br, Cl, OR, OH and H, and R is selected from the group consisting of alkyl with 1 to 16 carbon atoms and aryl, and the formation of the final block copolymer.

28. A method according to claim 27 wherein said bifunctional compound silicon-organic compound is

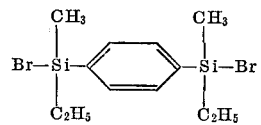

References Cited

UNITED STATES PATENTS 3,223,686  12/1965  Natta et al. _____ 260—827
3,483,270  12/1969  Bostick _____ 260—827

SAMUEL H. BLECH, Primary Examiner

U.S. Cl. X.R.

260—33.6 A, 33.6 SB, 80 PS